United States Patent
Mathew et al.

(10) Patent No.: US 9,152,875 B2
(45) Date of Patent: Oct. 6, 2015

(54) PRESERVING TEXT QUALITY IN VIDEO ENCODING

(75) Inventors: Manu Mathew, Bangalore (IN); Soyeb Nagori, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 755 days.

(21) Appl. No.: 12/777,433

(22) Filed: May 11, 2010

(65) Prior Publication Data

US 2010/0316119 A1    Dec. 16, 2010

Related U.S. Application Data

(60) Provisional application No. 61/186,206, filed on Jun. 11, 2009.

(51) Int. Cl.
| | |
|---|---|
| *G06K 9/32* | (2006.01) |
| *H04N 19/149* | (2014.01) |
| *H04N 19/61* | (2014.01) |
| *H04N 19/124* | (2014.01) |
| *H04N 19/14* | (2014.01) |
| *H04N 19/152* | (2014.01) |

(52) U.S. Cl.
CPC ............ *G06K 9/3266* (2013.01); *H04N 19/124* (2014.11); *H04N 19/14* (2014.11); *H04N 19/149* (2014.11); *H04N 19/152* (2014.11); *H04N 19/61* (2014.11)

(58) Field of Classification Search
CPC .. H04N 7/50; H04N 7/26244; H04N 7/26271
USPC .......................................................... 375/240
See application file for complete search history.

(56) References Cited

U.S. PATENT DOCUMENTS

| | | | | |
|---|---|---|---|---|
| 7,194,140 | B2 * | 3/2007 | Ito et al. ........................ | 382/251 |
| 7,668,382 | B2 * | 2/2010 | Wu et al. ....................... | 382/232 |
| 2003/0086127 | A1 * | 5/2003 | Ito et al. ....................... | 358/462 |
| 2003/0095686 | A1 * | 5/2003 | Montgomery ................ | 382/103 |
| 2003/0214422 | A1 * | 11/2003 | Saunders ....................... | 341/51 |
| 2004/0013202 | A1 * | 1/2004 | Lainema .................. | 375/240.18 |
| 2005/0123198 | A1 * | 6/2005 | Wolf et al. .................... | 382/176 |
| 2006/0274833 | A1 * | 12/2006 | Kojokaro et al. ......... | 375/240.16 |
| 2007/0237237 | A1 * | 10/2007 | Chang et al. ............. | 375/240.21 |
| 2009/0067709 | A1 * | 3/2009 | Gross et al. ................... | 382/166 |

OTHER PUBLICATIONS

Understanding H.264 Video, Document ID: IC-COD-REP020-1.2-Approved, Copyright © 2006 IndigoVision. All rights reserved, Dated Nov. 20, 2006, pp. 1-15.

(Continued)

*Primary Examiner* — Anner Holder
*Assistant Examiner* — Nam Pham
(74) *Attorney, Agent, or Firm* — Mirna Abyad; Frank D. Cimino

(57) ABSTRACT

A video encoder receives a macro-block of an image frame, and determines whether the macro-block contains text. The video encoder computes a quantization parameter for quantizing the macro-block, with the quantization parameter computed to be smaller if the macro-block is determined to contain text. The video encoder encodes the macro-block using the quantization parameter. Text quality in the encoded macro-block is preserved.

18 Claims, 6 Drawing Sheets

(56) References Cited

OTHER PUBLICATIONS

Gary J. Sullivan, Thomas Wiegand and Heiko Schwarz, "Editors' draft revision to ITU-T Rec. H.264 | ISO/IEC 14496-10 Advanced Video Coding—in preparation for ITU-T SG 16 AAP Consent", Jan. 29-Feb. 3, 2009, pp. 1-683.

"Advanced video coding for generic audiovisual services", ITU-T Recommendation H.264, Year Mar. 2005, pp. 1-343.

Thomaswiegand, Gary J. Sullivan, Gisle Bjøntegaard, and Ajay Luthra, "Overview of the H.264/AVC Video Coding Standard", IEEE Transactions on Circuits and Systems for Video Technology, vol. 13, No. 7, July 2003, pp. 560-576.

"Transform and quantization", H.264 / MPEG-4 Part 10 White Paper, http://www.vcodex.com/files/h264_transform.pdf Year Mar. 19, 2003, p. 1-9.

O. R. Vincent and O. Folorunso, "A Descriptive Algorithm for Sobel Image Edge Detection", Proceedings of Informing Science & IT Education Conference (InSITE) 2009, pp. 97-107.

"CS4670/7670 Project 2 Part (a)", http://people.cs.missouri.edu/~zengw/courses/CS4670/proj2_a.pdf pp. 1-4.

ITU-T Recommendation H.264, "Advanced video coding for generic audiovisual services", Mar. 2005.

\* cited by examiner

PRESERVING TEXT QUALITY IN VIDEO ENCODING

RELATED APPLICATION(S)

The present application claims the benefit of U.S. provisional application Ser. No. 61/186,206, entitled: "Improved text quality in Video Coding", filed on Jun. 11, 2009, naming the same inventors as in the subject application, and is incorporated in its entirety herewith.

BACKGROUND

1. Technical Field

Embodiments of the present disclosure relate generally to video encoding, and more specifically to preserving text quality in video encoding.

2. Related Art

Video encoding (or video coding) generally refers to operation(s) performed to convert image frames into an encoded form optimized for transmission and/or storage. Video encoding may involve operations such as compression, encryption, quantization, etc.

Image frames may contain text as well as picture information, and accordingly video encoding operations generally need to be designed to ensure that perceptual quality of the image frames after decoding (from the corresponding encoded form) is high. Perceptual quality refers generally to a subjective measure of how clearly the details of the image frame can be visually perceived. Thus, text quality refers to a measure of how clearly text that may be contained in an image frame may be perceived after decoding from the encoded form.

Several embodiments of the present disclosure address encoding techniques aimed at preserving perceptual quality of text when decoded (and viewed) from the encoded form.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A video encoder receives a macro-block of an image frame, and determines whether the macro-block contains text. The video encoder computes a quantization parameter for quantizing the macro-block, with the quantization parameter computed to be smaller if the macro-block is determined to contain text. The video encoder encodes the macro-block using the quantization parameter.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

Example embodiments will be described with reference to the accompanying drawings briefly described below.

The drawing in which an element first appears is indicated by the leftmost digit(s) in the corresponding reference number.

DETAILED DESCRIPTION

Various embodiments are described below with several examples for illustration.

1. Example Device

Figure 1:
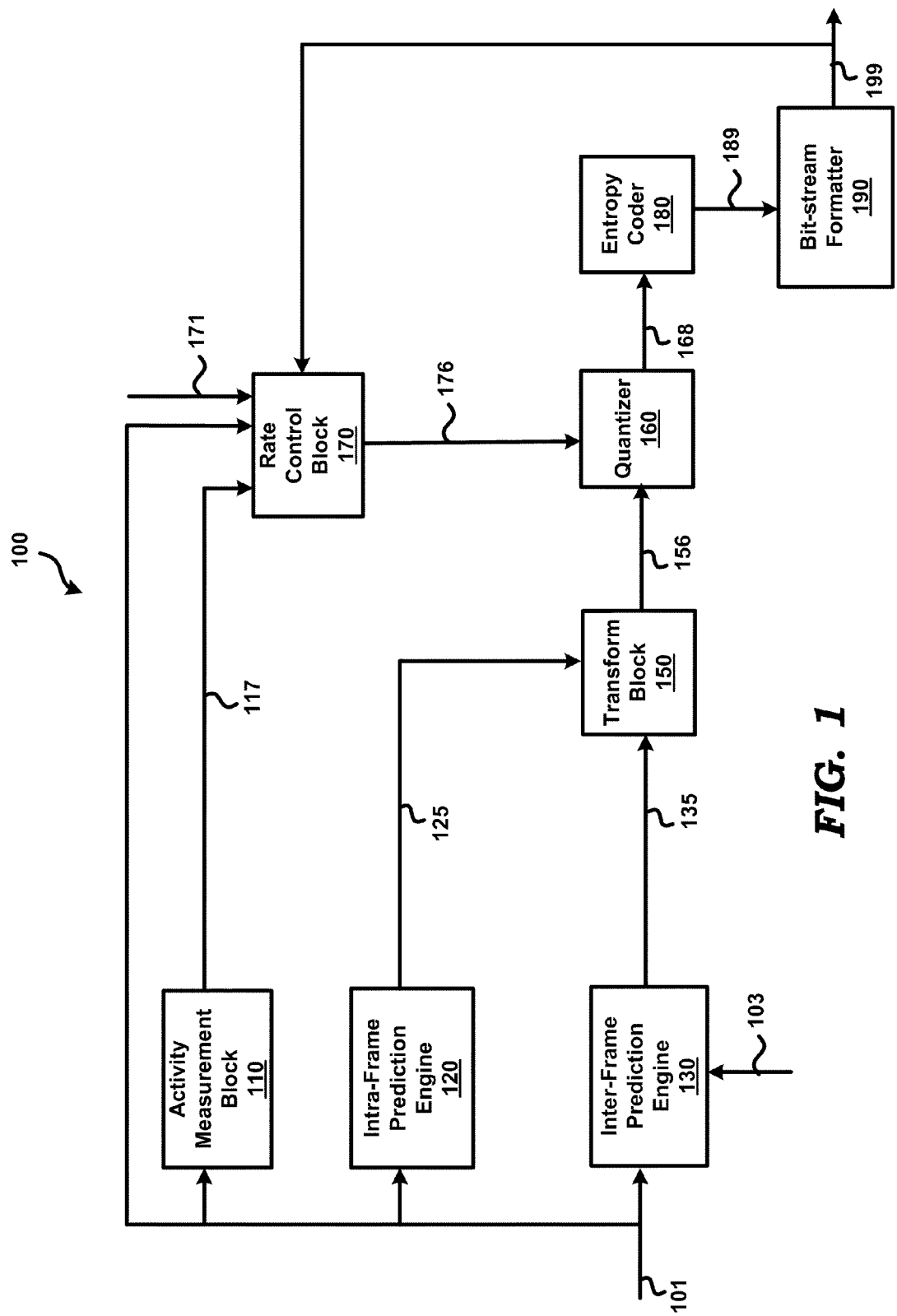
FIG. 1 is a block diagram illustrating the details of an example device in which several embodiments can be implemented.

FIG. 1 is a block diagram illustrating the details of an example device in which several aspects of the present invention can be implemented. Video encoder 100 is shown containing activity measurement block 110, intra-frame prediction engine 120, inter-frame prediction engine 130, transform block 150, quantizer 160, rate control block 170, entropy coder 180 and bit-stream formatter 190. The details of video encoder 100 of FIG. 1 are meant to be merely illustrative, and real-world implementation may contain more blocks/components and/or different arrangement of the blocks/components. For example, video encoder may additionally contain blocks for performing encoded-frame reconstruction, filtering (in a de-blocking filter), and for storage, but not shown in FIG. 1 for conciseness. Video encoder 100 receives image frames to be encoded on path 101, and generates a corresponding encoded frame (in the form of an encoded bit-stream) on path 199.

The blocks of video encoder 100 may be designed to perform video encoding consistent with one or more specifications/standards, such as H.261, H.263, H.264, etc., in addition to being designed to address preserving text quality, as described in detail in sections below. Accordingly, an image frame received on path 101 may be processed by either intra-frame prediction engine 120 or inter-frame prediction engine 130 depending on whether an intra-coded (I) frame or predicted (P) frame is to be provided to transform block 150. In addition, though not shown, video encoder 100 may also contain block(s) for generating bi-directionally interpolated (B) frames. The image frames received on path 101 may be retrieved from a storage device (not shown in FIG. 1), and may be in (YCbCr) format. Alternatively, the image frames may be provided in (RGB) format, and converted (YCbCr) format internally in the corresponding blocks (110, 120 or 130) prior to further processing.

Activity measurement block 110 receives image frames on path 101, and determines the 'activity' represented in corresponding macro-blocks of the image frame. The term 'activity' herein refers to the extent of variation in the values of pixels contained in a macro-block. Thus, in general, a macro-block with higher 'activity' contains greater variation in its pixel values, and is termed as having more higher-frequency components (in terms of variation in the pixel values) than low-frequency components. On the other hand, a macro-block with lower 'activity' contains lesser variation in its pixel values, and is termed as having more of low-frequency components than high-frequency components. Activity measurement block 110 provides as an output, on path 117, an 'activity measure' (mbAct) representing an 'activity measure' of the corresponding macro-block. The manner in which 'activity measure' (mbAct) is computed in an embodiment is described in sections below.

Intra-frame prediction engine 120 receives image frames on path 101. Assuming a received image frame is to be encoded as an (I) frame, intra-frame prediction engine 120 operates to encode macro-blocks in the received image frame based on other macro-blocks in the same image frame. Intra-frame prediction engine 120 thus uses spatial compression techniques to encode an (I) frame. The specific techniques to encode an (I) frame may be performed consistent with the standard(s) noted above. Accordingly, intra-frame prediction engine 120 may operate to determine correlation between macro-blocks in the image frame. A macro-block determined to have high correlation (identical or near-identical content) with another (reference) macro-block may be represented by identifiers of the reference macro-block, the location of the macro-block in the image frame with respect to the reference macro-block, and the differences (termed residual) between pixel values of the two macro-blocks. Intra-frame prediction engine 120 forwards the compressed representation of a macro-block thus formed on path 125. For macro-blocks that are determined not to have high correlation with any other macro-block in the received image frame, intra-frame prediction engine 120 forwards the entire macro-block contents (for example, Y, Cb, Cr pixel values of pixels of the macro-block) on path 125.

Inter-frame prediction engine 130 receives image frames on path 101. Assuming a received image frame is to be encoded as a (P) frame, inter-frame prediction engine 130 operates to encode macro-blocks in the received image frame based on comparison with macro-blocks in a 'reference' frame (transmitted at an earlier time instance) received on path 103. Inter-frame prediction engine 130 thus uses temporal compression techniques to encode a (P) frame. The specific techniques to encode a (P) frame may be performed consistent with the standard(s) noted above. Blocks for reconstruction of a previously transmitted frame which is to be used as a reference frame for encoding (P) frames are not shown in FIG. 1, but assumed to be present. Inter-frame prediction engine 130 performs correlation between macro-blocks in a 'current' received image frame (on path 101), and macro-blocks in the reference frame (received on path 103) to determine macro-block pairs that are identical or near-identical in content. For matching macro-block pairs, inter-frame prediction engine 130 computes motion vectors representing the displacement between the macro-blocks. In addition, inter-frame prediction engine 130 computes corresponding residuals (differences between pixel values of the matching macro-blocks). Inter-frame prediction engine 130 forwards the motion vectors and the corresponding residuals on path 135. It is noted that frames that are not reference frames (I) may also be encoded using a combination of intra-frame and inter-frame prediction. Thus, some macro-blocks of a (P) frame may be encoded by intra-frame prediction engine 120, while others may be encoded by inter-frame prediction engine 130.

Transform block 150 transforms the residuals received on paths 125 and 135 into a compressed representation, for example, by transforming the information content in the residuals to frequency domain. In an embodiment, the transformation corresponds to a discrete cosine transformation (DCT). Accordingly, transform block 150 generates (on path 156) coefficients representing the magnitudes of the frequency components of residuals received on paths 125 and 135. Transform block 150 also forwards motion vectors (received on paths 125 and 135) to quantizer 160.

Quantizer 160 divides the values of coefficients corresponding to a macro-block (residual) by a quantization parameter (Qp). Alternatively, quantizer 160 may divide each coefficient in a set of coefficients representing a macro-block (or a macro-block residual) by a corresponding one of a set of quantization parameters in a scaling matrix. In general, the operation of quantizer 160 is designed to represent the coefficients by using a desired number of quantization steps, the number of steps used (or correspondingly the value of Qp or the values in the scaling matrix) determining the number of bits used to represent the residuals. Quantizer 160 receives the specific value of Qp or values in the scaling matrix to be used for quantization from rate control block 170 on path 176. Quantizer 160 forwards the quantized coefficient values and motion vectors on path 168.

Entropy coder 180 receives the quantized coefficients as well as motion vectors on path 168, and allocates codewords to the quantized transform coefficients. Entropy coder 180 may allocate codewords based on the frequencies of occurrence of the quantized coefficients. Frequently occurring values of the coefficients are allocated codewords that require fewer bits for their representation, and vice versa. Entropy coder 180 forwards the entropy-coded coefficients on path 189.

Bit-stream formatter 190 receives the compressed, quantized and entropy coded output (referred to as a bit-stream, for convenience) of entropy coder 180 on path 189, and may include additional information such as headers, information that may be required to enable a decoder to decode the encoded frame, etc., to the bit-stream. Bit-stream formatter 190 may transmit or store locally the formatted bit-stream representing encoded images.

Rate control block 170 receives image frames on path 101, activity measures of macro-blocks on path 117, and a 'current' transmission bit-rate from path 199, and operates to determine quantization parameter(s) to be used for quantizing the corresponding macro-blocks of image frames. Rate-control block 170 may also receive data specifying a 'desired' bit-rate to be maintained (for bits transmitted on path 199) via path 171. Rate control block 170 provides the computed quantization parameter(s) on path 176.

To maintain transmission bit-rate requirements and/or to minimize storage requirements, macro-blocks with higher activity measures (as indicated by the output 117 of activity measurement block 110) may be quantized using fewer bits (coarse quantization). A desired transmission bit-rate and/or storage requirement may be viewed as representing a desired 'output parameter' of the bit-stream on path 199 that may be required to be ideally satisfied. Text portions frequently correspond to high-activity portions of an image frame. Consequently, coarse quantization of text portions may degrade perceptual quality of the text (i.e., when decoded or reconstructed). Hence it may be desirable to treat macro-blocks containing text differently from other macro-blocks, in terms of the number of bits used to represent the macro-blocks.

Video encoder 100 is implemented to ensure that text quality is preserved in the encoding process, as described next.

2. Preserving Text Quality

Figure 2:
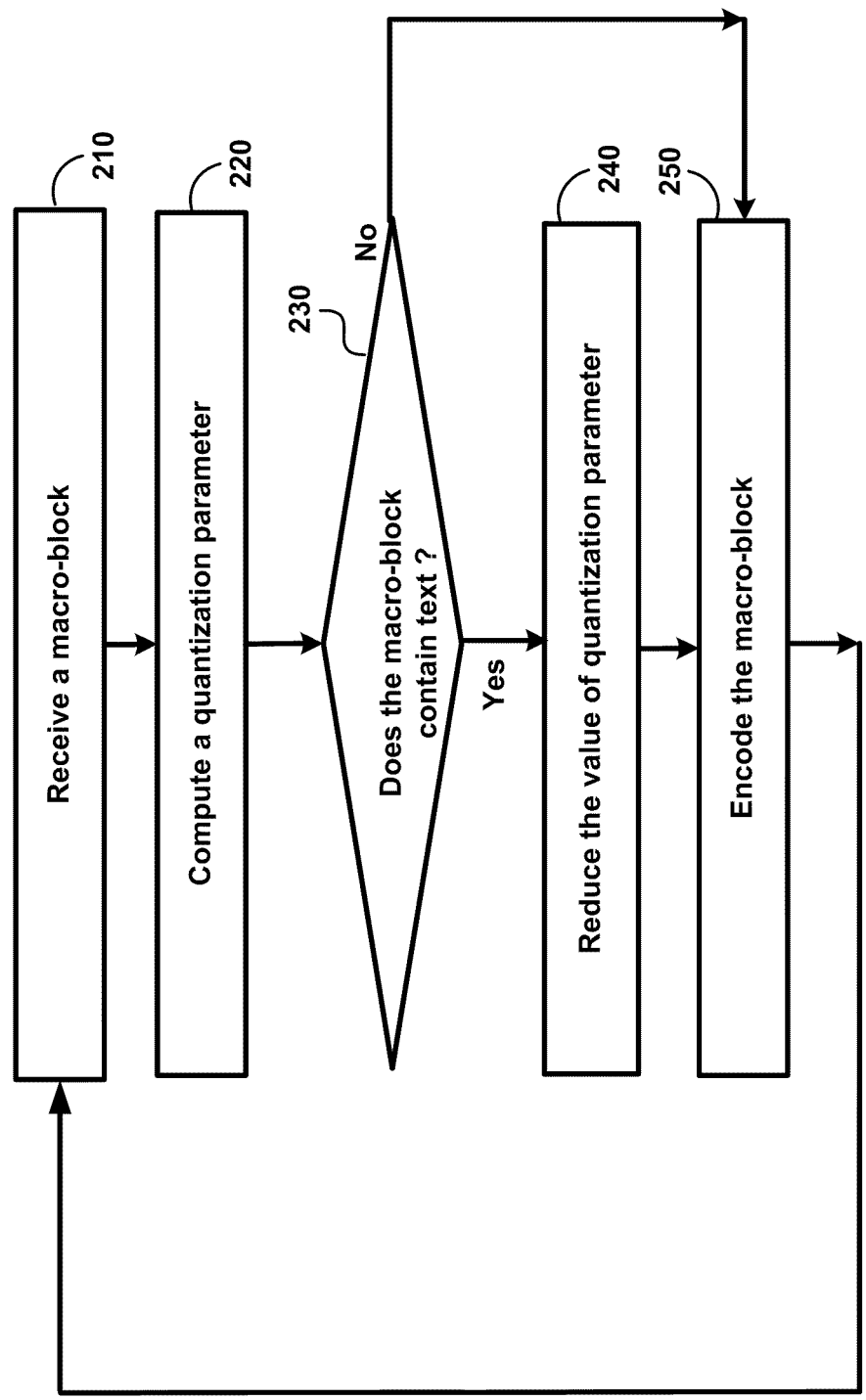
FIG. 2 is a flow diagram illustrating the manner in which text quality is preserved while encoding image frames, in an embodiment.

FIG. 2 is a flow diagram illustrating the manner in which text quality is preserved while encoding image frames, in an embodiment. The flow diagram is described with respect to video encoder 100 of FIG. 1, merely for illustration. However, various features described herein can be implemented in other devices and/or environments and using other components, as will be apparent to one skilled in the relevant arts by reading the disclosure provided herein.

Further, the steps in the flow diagram are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein.

In step 210 according to the flow diagram, video encoder 100 receives a macro-block to be encoded. Control then passes to step 220.

In step 220, video encoder 100 computes a quantization parameter to be used to quantize the macro-block. The quantization parameter value determines the number of bits used to represent the encoded macro-block, and the computed value may be based on various considerations such as current transmission bit-rate, required transmission bit-rate, activity measure (if computed) of the macro-block. Control then passes to step 230.

In step 230, video encoder 100 determines if the macro-block contains text. Control passes to step 240 if video encoder 100 determines that the macro-block contains text, and to step 250 otherwise.

In step 240, video encoder 100 reduces the value of the quantization parameter computed in step 220. Alternatively, instead of reducing the computed quantization parameter, video encoder 100 may simply select a smaller predetermined value for the quantization parameter. Control then passes to step 250.

In step 250, video encoder 100 encodes the macro-block according to the value of the quantization parameter to generate an encoded macro-block. The encoding of the macro-block may include the operations described above with respect to the blocks of FIG. 1, in addition to the quantization operation using the corresponding value of the quantization parameter. Control then passes to step 210, and the corresponding steps of the flow diagram may be repeated.

In an embodiment, the operations described with respect to steps 220, 230 and 240 are performed by rate control block 170. However, in other embodiments, the operations could be performed by blocks other than rate control block 170, which would, in such embodiments, then operate in conjunction with the outputs of such blocks.

Thus, video encoder 100 treats macro-blocks containing text and non-text information differently, with macro-blocks identified as containing text being quantized with smaller values of quantization parameters. Accordingly, techniques to identify whether a macro-block contains text are described next.

3. Identifying Macro-Blocks Containing Text

In an embodiment, video encoder 100 operates on macro-blocks of size 16×16 pixels in an image frame as a basic unit for identifying text. However, in other embodiments, other macro-block sizes can be used as the basic unit as well. Each 16×16 macro-block is divided into four 8×8 macro-blocks. Video encoder 100 computes a parameter termed gradient for each pixel in each of the four 8×8 macro-blocks thus obtained. For each pixel, the gradient is defined as the maximum of the gradients in horizontal, vertical or diagonal directions.

$$\text{Grad\_}H(x,y)=|O(x,y)-O(x+1,y)| \quad \text{Equation 1}$$

$$\text{Grad\_}V(x,y)=|O(x,y)-O(x,y+1)| \quad \text{Equation 2}$$

$$\text{Grad\_}D(x,y)=|O(x,y)-O(x+1,y+1)| \quad \text{Equation 3}$$

$$\text{Grad}(x,y)=\max(\text{Grad\_}H(x,y),\text{Grad\_}V(x,y),\text{Grad\_}D(x,y)) \quad \text{Equation 4}$$

wherein,

O(x, y) is the pixel value at co-ordinate (x,y) of the image frame,

O(x+1, y) is the pixel value at co-ordinate (x+1,y) of the image frame,

O(x, y+1) is the pixel value at co-ordinate (x,y+1) of the image frame,

O(x+1, y+1) is the pixel value at co-ordinate (x+1,y+1) of the image frame,

Grad_H(x, y) is the gradient for a pixel in horizontal direction,

Grad_V(x, y) is the gradient for a pixel in vertical direction,

Grad_D(x, y) is the gradient for a pixel in diagonal direction,

Grad (x, y) is the maximum of the gradients in horizontal, vertical or diagonal directions.

It is noted that equations 1 through 4 for computing the gradient are provided merely by way of example, and that video encoder 100 may employ alternative techniques for computing the gradient. As an example of one such alternative technique, the gradient may be computed without using the diagonal gradient component Grad_D(x,y) noted above, and as specified by equation 5 below:

$$\text{Grad}(x,y)=\max(\text{Grad\_}H(x,y),\text{Grad\_}V(x,y)) \quad \text{Equation 5}$$

A yet another technique of computing gradient that may be used by video encoder 100 is specified by equation 6 below:

$$\text{Grad}(x,y)=\text{Sqrt}(\text{Grad\_}H(x,y)*\text{Grad\_}H(x,y)+\text{Grad\_}V(x,y)*\text{Grad\_}V(x,y)) \quad \text{Equation 6}$$

wherein,

Sqrt( ) is a square root operator.

Another technique of computing gradient that may be used by video encoder 100 uses the Sobel operator, as described in the document "A Descriptive Algorithm for Sobel Image Edge Detection", O. R. Vincent, O. Folorunso, Proceedings of Informing Science & IT Education Conference (InSITE) 2009.

Having computed the gradient corresponding to each pixel for each of the four 8×8 blocks within a macro-block, video encoder 100 determines, for each of the four 8×8 blocks (termed sub-blocks), the number of pixels with gradients (computed as described by equations 1 through 4 above) greater than a threshold value TH_DIFF. Pixels with gradients greater than the TH_DIFF are deemed to be located at an edge representing a transition from a text portion to a non-text portion. Threshold TH_DIFF may be set as a fixed or a variable threshold. Threshold TH_DIFF may be determined or adjusted based on feedback from the text detection performance in previous encoded frames. Thus, for example, if text was determined as being contained in too few or too many of the previous frames, the value of TH_DIFF may be accordingly changed.

For each of the four 8×8 sub-blocks, video encoder 100 determines the number of pixels (referred to herein as edge_pixel_count) with gradients greater than TH_DIFF. Video encoder 100 then determines a parameter edge_ pixel_count_mb for the 16×16 macro-block as the maximum of the edge_pixel_count values obtained for each of the four 8×8 sub-blocks. Again, the technique of taking the maximum of the edge_pixel_count of the four 8×8 sub-blocks to find edge_pixel_count_mb is noted merely by way of example. Alternative approaches can instead use the sum of edge_pixel_count values for the four 8×8 sub-blocks, or simply the edge_pixel_count within the whole 16×16 macro-block.

Based on the value of edge_pixel_count_mb thus obtained for the macro-block, video encoder 100 classifies the macro-block as one of three types, namely, 'flat', 'text' and 'texture'. Type 'flat' indicates that the macro-block contains 'plain' content without fine details, much intensity or color change (e.g., as typically seen in pictures of the sky, walls, white paper etc.). Type 'texture' indicates that the macro-block contains very fine details (e.g., as typically seen in pictures of grass, mat, etc.). Type 'text' indicates that the macro-block is determined as containing text. Determination of the type as one of 'flat', 'text' and 'texture' is based on the following relationships:

macro-block is of type 'text' if the value of edge_pixel_count_mb is greater than a threshold TH_TEXT and less than another threshold TH_TEXTURE, macro-block is of type 'flat' if the value of edge_pixel_count_mb is less than or equal to the threshold TH_TEXT, macro-block is of type 'texture' if the value of edge_pixel_count_mb is greater than or equal to the threshold TH_TEXTURE.

Thresholds TH_TEXT and TH_TEXTURE may be empirically determined and be changed dynamically. In an embodiment, video encoder 100 adjusts the value of TH_TEXT and TH_TEXTURE from frame to frame, such that it lies within a reasonable range, for example within (0.75*mbwidth) and (1.25*mbwidth), wherein 'mbwidth' represents the width of the frame being encoded in terms of the number of macro-blocks widthwise.

In an alternative embodiment, thresholds TH_TEXT and TH_TEXTURE are determined adaptively for each image frame such that at least one row of macro-blocks in the corresponding image frame is classified as containing text.

In yet another embodiment there could be overlapping ranges of threshold values such as TH_TEXT_LOW and TH_TEXT_HIGH for type 'text', TH_TEXTURE_LOW and TH_TEXTURE_HIGH for type 'texture', and TH_FLAT_LOW and TH_FLAT_HIGH for type 'flat'. Thus, when the edge_pixel_count_mb has a value lying within the range TH_TEXT_LOW and TH_TEXT_HIGH, the macro-block is classified as text.

In still another embodiment, video encoder 100 classifies a (16×16) macro-block as containing text even if only one (8×8) sub-block in the (16×16) macro-block is identified as containing text (i.e., if the edge_pixel_count value for the one sub-blocks has a gradient greater than TH_DIFF).

Video encoder 100 selects a small value for the quantization parameter if a macro-block is identified as containing text, thereby representing the 'text' macro-block with larger number of bits, thus preserving text quality. On the other hand, when a macro-block is identified as not containing text (non-text macro-block), the number of bits that video encoder 100 may use to quantize the non-text macro-block (step 240) may be based, for example, on whether the macro-block is identified as being of type 'flat' or 'texture', or other considerations. Assuming that video encoder 100 had previously set the quantization parameter to a large value (for example, based on determination that the corresponding macro-block has high activity and hence needs to be quantized coarsely), on identifying that the macro-block contains text video encoder 100 may reduce the value of the quantization parameter.

The operations for determining whether text is contained in a macro-block or not may be performed by rate control block 170. However, in other embodiments, the operations could be performed by blocks other than rate control block 170, which would, in such embodiments, then operate in conjunction with the outputs of such blocks.

In an alternative embodiment, video encoder 100 bases an assumption of whether a macro-block represents text or not (and therefore the number of bits used to quantize the macro-block) on other considerations (without specifically operating to identify text), as described below.

4. Considerations Based on Bit-Rate and Frame Size

Figure 3:
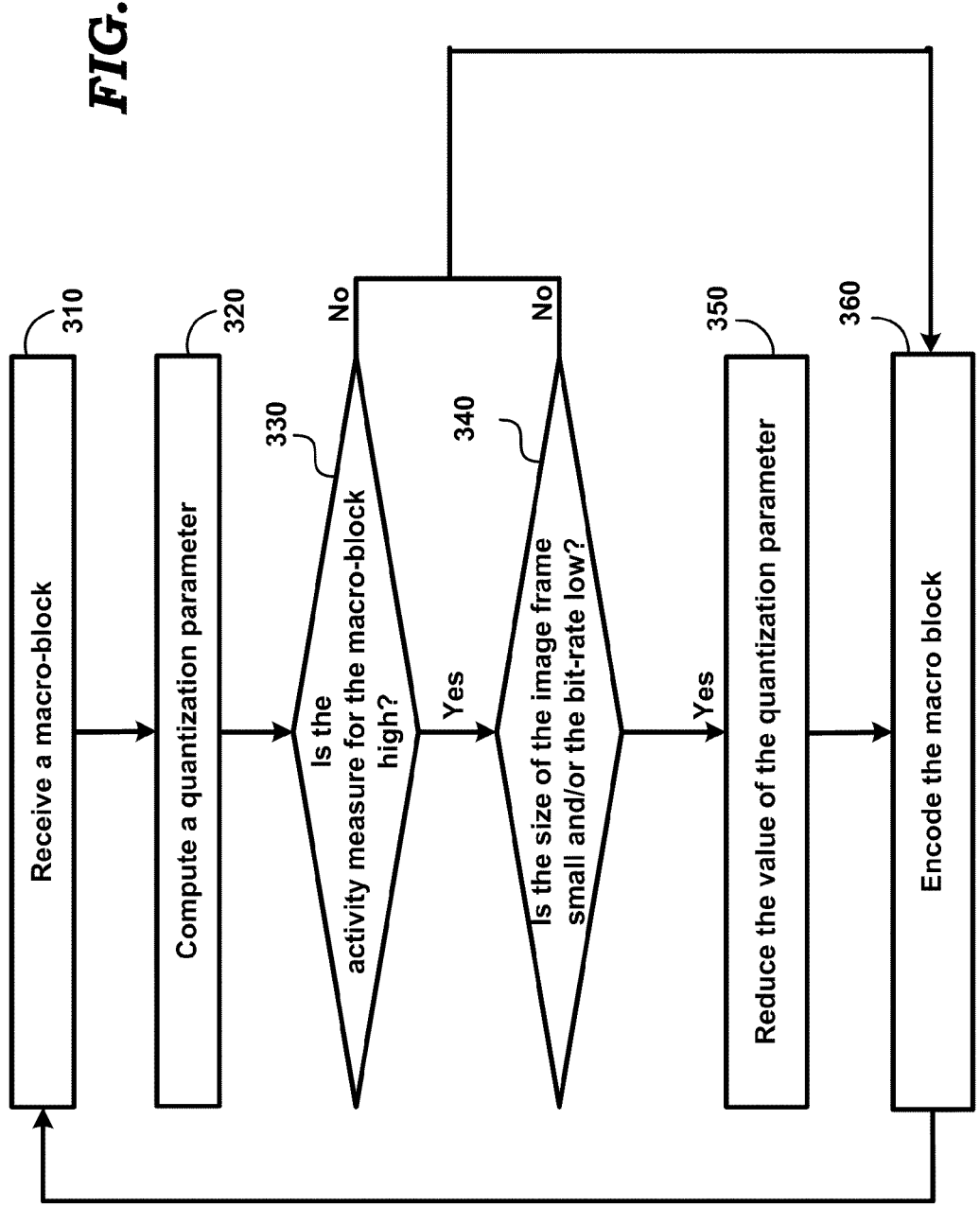
FIG. 3 is a flow diagram illustrating the manner in which text quality is preserved while encoding image frames, in another embodiment.

FIG. 3 is a flow diagram illustrating the manner in which text quality is preserved while encoding image frames, in an alternative embodiment. The flow diagram is described with respect to the device of FIG. 1, merely for illustration. However various features described herein can be implemented in other environments and using other components, as will be apparent to one skilled in the relevant arts by reading the disclosure provided herein.

Further, the steps in the flowchart are described in a specific sequence merely for illustration. Alternative embodiments using a different sequence of steps can also implemented without departing from the scope and spirit of several aspects of the present invention, as will be apparent to one skilled in the relevant arts by reading the disclosure provided herein.

In step 310 according to the flow diagram, video encoder 100 receives a macro-block to be encoded. Control then passes to step 320.

In step 320, video encoder 100 computes a quantization parameter to be used to quantize the macro-block. The quantization parameter value determines the number of bits used to represent the encoded macro-block, and the computed value may be based on various considerations such as current transmission bit-rate, required transmission bit-rate, activity measure (if computed) of the macro-block. Control then passes to step 330.

In step 330, video encoder 100 determines if the 'activity measure' for the macro-block is high. Determination of the 'activity measure' as high may be based on comparison with a threshold value, wherein the activity measure is deemed to be high, if the activity measure is greater than the threshold value. Control passes to step 340 if video encoder 100 determines the 'activity measure' to be high for the macro-block, and to step 360 otherwise.

In step 340, video encoder 100 determines if the size of the image frame is small and/or the (available) bit-rate at which bits representing the encoded image frame are to be transmitted is low. The size of the image frame and the bit-rate may respectively be determined to be small and low if their values are less than corresponding threshold values. Control passes to step 350 if video encoder 100 determines the size of the image frame to be small and/or the (available) bit rate at which bits representing the encoded image frame are to be transmitted is low, and to step 360 otherwise.

In step 350, video encoder 100 reduces the value of the quantization parameter computed in step 320. Alternatively, instead of reducing the computed quantization parameter, video encoder 100 may simply select a smaller predetermined value for the quantization parameter. Control then passes to step 360.

In step 360, video encoder 100 encodes the macro-block according to the value of the quantization parameter, to generate an encoded macro-block. Control then passes to step 310, and the corresponding steps of the flow diagram may be repeated.

In an embodiment, the operations described with respect to steps 310, 320, 330, 340 and 350 are performed by rate control block 170. However, in other embodiments, the operations could be performed by blocks other than rate control block 170, which would, in such embodiments, then operate in conjunction with the outputs of such blocks.

The techniques described in the flow diagram of FIG. 3 are based on the recognition that macro-blocks containing text generally have high activity measures due to the abrupt variations in the values of pixels at boundary locations between text and non-text regions of the macro-block. The techniques are also based on the observation that using fewer bits to represent macro-blocks containing text portions generally results in poorer text quality. Thus, while it may be desirable to otherwise (e.g., when the macro-block represents only pictures) use larger quantization parameter values to quantize 'high activity measure' macro-blocks (to maintain a desired minimum transmission bit-rate or to minimize storage requirements), use of such larger quantization parameter values when the macro-block contains text may degrade text quality. The degradation may be particularly severe when the image frame has a small size and the transmission bit-rate (or bandwidth) used to transmit the encoded image frame is low, or the bandwidth available is itself low. By using smaller values of quantization parameter for quantizing macro-blocks when the image size is small, and/or the bit-rate is low, video encoder ensures that text quality is preserved in the encoding process, text being assumed to be present if the activity measure is high or has a value in a corresponding value range.

The manner in which the techniques of the flow diagram of FIG. 3 are applied in embodiments is illustrated with examples below.

5. Examples

In an embodiment, video encoder 100 determines the value of the quantization parameter to be used to quantize a macro-block according to equation 5 below:

$$Qmb = Qbase*(K*mbAct+frameAct)/(mbAct+K*frameAct) \quad \text{Equation 5}$$

wherein,

Qbase is the quantization parameter provided by a rate control algorithm (e.g., in rate control block 170), mbAct is the activity measure of a macro-block to be processed, frameAct is the average activity measure of the frame containing the macro-block to be processed, or a previous frame, K is a scale factor, Qmb is a modified quantization parameter to be used for actual quantization.

Video encoder 100 calculates the 'activity measure' of a macro-block according to equations 6 and 7.

$$dij = |Oij - Oi(j-1)| + |Oij - O(i-1)j| \quad \text{Equation 6}$$

wherein,

Oij−Oi(j−1) is the difference between the pixel values at locations (i,j) and (i,j−1), and is a measure of 'horizontal activity', Oij−O(i−1)j is the difference between the pixel values at locations (i,j) and (i−1,j), and is a measure of 'vertical activity', dij is the sum of absolute values of horizontal activity and vertical activity corresponding to a pixel.

Activity measure mbAct is then obtained as the sum of dij values obtained for all pixels in the macro-block, as described by equation 7:

$$mbAct = \Sigma\Sigma dij \quad \text{Equation 7}$$

wherein, Σ represents a summation operation, and the limits of summation range from 0 to N, with N representing the size (in terms of the number of pixels) in a square macro-block.

Figure 4B:
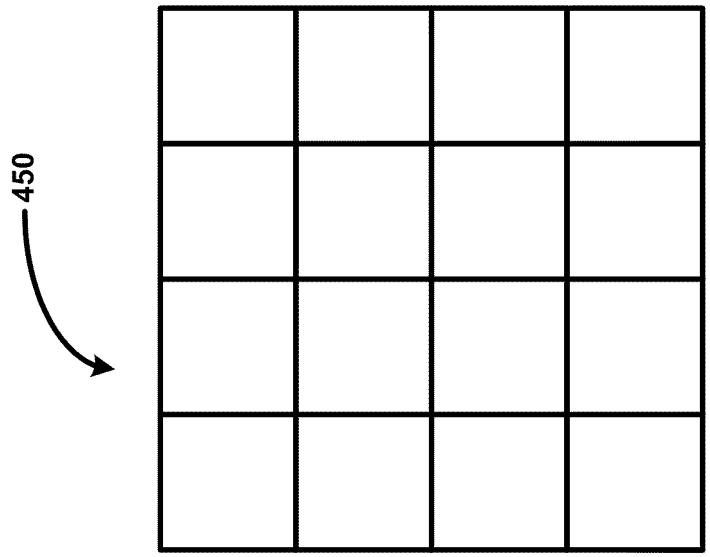
FIG. 4B is a diagram illustrating an example macro-block having a low activity measure.
Figure 4A:
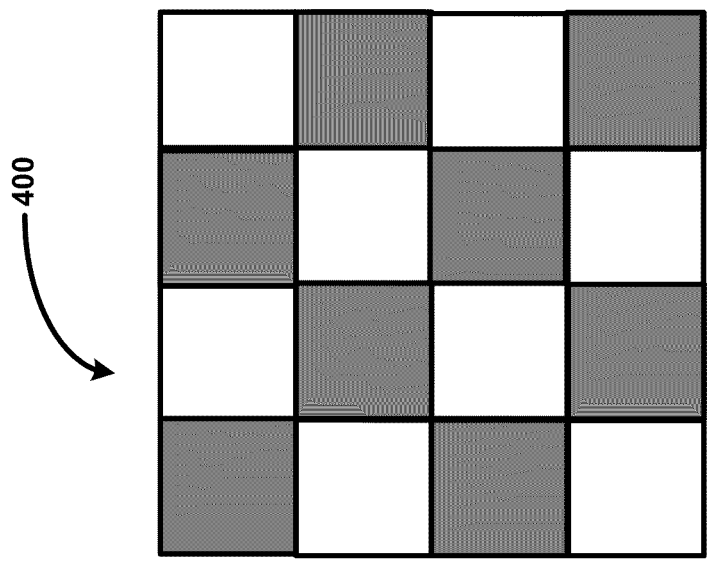
FIG. 4A is a diagram illustrating an example macro-block having a high activity measure.

FIGS. 4A and 4B are used to illustrate the term 'activity measure', and show macro-blocks 400 and 450, square blocks in each of which are assumed to represent pixels. Macro-block 400 (assumed to be a 4×4 pixel macro-block) is shown as having large variations in the pixel values (neighboring pixels shown as alternately 'black' and 'white'). Macro-block 450 (also assumed to be a 4×4 pixel macro-block) is shown as having no variations in its pixel values. Hence, the activity measure of macro-block 400 is higher than that of macro-block 450.

Video encoder 100 (or rate control block 170) selects a higher value of scale factor K if the size of the image frame and the bit-rate are large/high. On the other hand, video encoder 100 (or rate control block 170) selects a lower value of scale factor K if the size of the image frame and the bit-rate are small/low. As noted above, the approach of above relies on the observation that text is more prone to be mistaken for high-activity picture at smaller video resolutions and/or lower bit rates.

6. Adaptive Selection of Scaling Matrix

In another embodiment, video encoder 100 adaptively selects scaling matrices used for quantizing macro-blocks based on the activity measure, frame size and bit-rate corresponding to an image frame. A scaling matrix generally refers to a matrix of quantization parameter values, each quantization parameter value in the matrix used to quantize the coefficient of a corresponding frequency component of a 'transformed' (e.g., using DCT) image frame or portion (e.g., macro-block) of an image frame. For example, the transform operation on a block of size 4×4 pixels would generate sixteen coefficients representing the magnitudes of the corresponding ones of sixteen frequency components.

In the embodiment, video encoder 100 determines the frame size and bit-rate corresponding to an image frame, and selects one of multiple scaling matrices based on comparison of the frame size and bit rate against predetermined thresholds. Video encoder 100 quantizes an image frame with size and bit-rate less than the corresponding thresholds with a 'moderate' scaling matrix (smaller values of quantization parameters for higher frequency components), and quantize an image frame with size and bit-rate greater than (or equal to) the corresponding thresholds with a 'sharp' scaling matrix (larger values of quantization parameters for higher frequency components).

For example, video encoder 100 may use a 'moderate' scaling matrix 'A' to quantize a 4×4 intra coded macro-block (with pixels represented in Y/Cb/Cr format) that has been determined as having a frame size and a bit-rate less than the predetermined thresholds and an activity measure higher than the corresponding threshold, with matrix 'A' as given below:

A={16, 18, 18, 20, 20, 20, 23, 23, 23, 23, 27, 27, 18, 30, 30, 32},
wherein the quantization parameters listed from left to right (entries 0 through 15) correspond respectively to frequency components from lower to higher frequencies in zig-zag order.

Figure 4C:
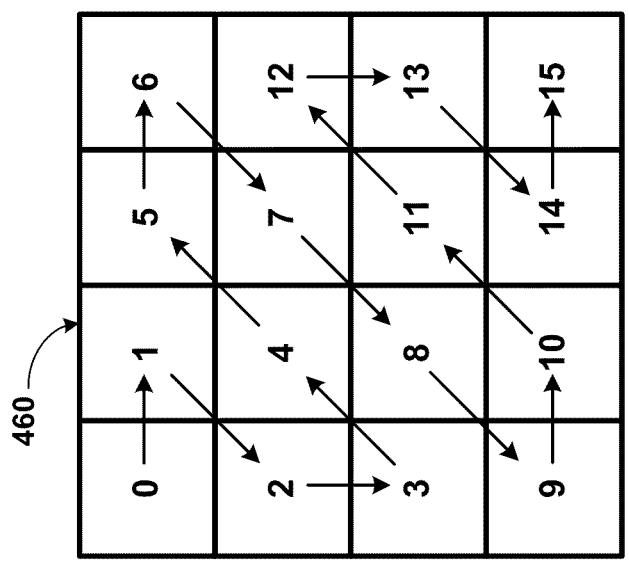
FIG. 4C is a diagram used to illustrate zig-zag reordering of transform coefficients of a macro-block.

Zig-zag order refers to a type of ordering in which transform coefficients may be ordered for transmission in video codecs, and differs from raster order (left to right order) such that in common video sequences, coefficients with higher values are transmitted first. Zig-zag ordering reorganizes the transform coefficients in two-dimensional (2D) form (e.g., as may be obtained by operation of transform block 130) into a one-dimensional (1-D) stream for transmission. The zig-zag ordering for a 4×4 matrix (460) of transformed coefficients is shown in FIG. 4C. The entries 0 through 15 in 1-D matrix 'A' above are obtained by traversing the actual 2D matrix (A_4×4) shown below in the direction of the arrows:

$$A\_4 \times 4 = \begin{Bmatrix} 16, & 18, & 20, & 23, \\ 18, & 20, & 23, & 18, \\ 20, & 23, & 27, & 30, \\ 23, & 27, & 30, & 32 \end{Bmatrix}$$

With respect to FIG. 1, transform block 130 may itself perform the zig-zag ordering.

Video encoder 100 may use a 'sharp' scaling matrix 'B' to quantize the same 4×4 intra coded macro-block that has been determined as having a frame size and a bit-rate larger than (or equal to) the predetermined thresholds and an activity measure lower than the corresponding threshold, with matrix 'B' as given below:
B={12, 26, 26, 40, 40, 40, 56, 56, 56, 56, 64, 64, 64, 74, 74, 84}, in which the quantization parameters listed from left to right correspond respectively to frequency components from lower to higher frequencies in zig-zag order.

It may be observed that the quantization parameter values corresponding to higher frequency components in scaling matrix 'A' are smaller than those in scaling matrix 'B'. For example, the quantization parameter value corresponding to the highest frequency component has a value 32 in matrix 'A', but has a value 84 in matrix 'B'.

Similar examples for other sizes/types of macro-blocks are provided below. The entries of the 1-D matrices below are assumed to be according to the zig-zag order for the corresponding matrix size.

Scaling matrix={16, 18, 18, 20, 20, 20, 23, 23, 23, 23, 27, 27, 27, 30, 30, 32} for a 4×4 inter block, if frame size and bit-rate are less than the predetermined thresholds and an activity measure higher than the corresponding threshold, while
Scaling matrix={20, 28, 28, 40, 40, 40, 48, 48, 48, 48, 54, 54, 54, 60, 60, 68} otherwise.

Scaling matrix={16, 17, 17, 18, 17, 18, 19, 19, 19, 19, 20, 20, 20, 20, 20, 21, 21, 21, 21, 21, 21, 22, 22, 22, 22, 22, 22, 22, 24, 24, 24, 24, 24, 24, 24, 24, 25, 25, 25, 25, 25, 25, 25, 27, 27, 27, 27, 27, 27, 28, 28, 28, 28, 28, 29, 29, 29, 29, 30, 30, 30, 31, 31, 32} for a 8×8 intra macro-block, if frame size and bit-rate are less than the predetermined thresholds and an activity measure higher than the corresponding threshold,
while Scaling matrix={12, 20, 20, 26, 22, 26, 32, 32, 32, 32, 36, 36, 36, 36, 36, 36, 46, 46, 46, 46, 46, 50, 50, 50, 50, 50, 50, 54, 54, 54, 54, 54, 54, 54, 54, 58, 58, 58, 58, 58, 58, 62, 62, 62, 62, 62, 66, 66, 66, 66, 66, 72, 72, 72, 72, 76, 76, 76, 80, 80, 84} otherwise.

Scaling matrix={16, 17, 17, 18, 17, 18, 19, 19, 19, 19, 20, 20, 20, 20, 21, 21, 21, 21, 21, 21, 22, 22, 22, 22, 22, 22, 22, 24, 24, 24, 24, 24, 24, 24, 24, 25, 25, 25, 25, 25, 25, 25, 27, 27, 27, 27, 27, 27, 28, 28, 28, 28, 28, 29, 29, 29, 29, 30, 30, 30, 31, 31, 32} for a 8×8 inter macro-block, if frame size and bit-rate are less than the predetermined thresholds and an activity measure higher than the corresponding threshold,
while Scaling matrix={18, 26, 26, 30, 26, 30, 34, 34, 34, 34, 38, 38, 38, 38, 38, 42, 42, 42, 42, 42, 42, 44, 44, 44, 44, 44, 44, 44, 48, 48, 48, 48, 48, 48, 48, 48, 50, 50, 50, 50, 50, 50, 50, 52, 52, 52, 52, 52, 52, 56, 56, 56, 56, 56, 60, 60, 60, 60, 64, 64, 64, 66, 66, 70} otherwise.

It is noted that the scaling matrix values (entries) above are provided merely by way of example. Other values for the scaling matrix entries can also be used instead, and may be implementation or deployment environment specific.

Video encoder 100 may be implemented using software, hardware, or a combination of hardware and software. In general, when throughput performance is of primary consideration, the implementation is done more in hardware (e.g., in the form of an application specific integrated circuit). When cost is of primary consideration, the implementation is performed more in software (e.g., using a processor executing instructions provided in software/firmware). Cost and performance can be balanced by employing a mix of hardware, software and/or firmware. An example embodiment implemented substantially in software is described next.

7. Digital Processing System

Figure 5:
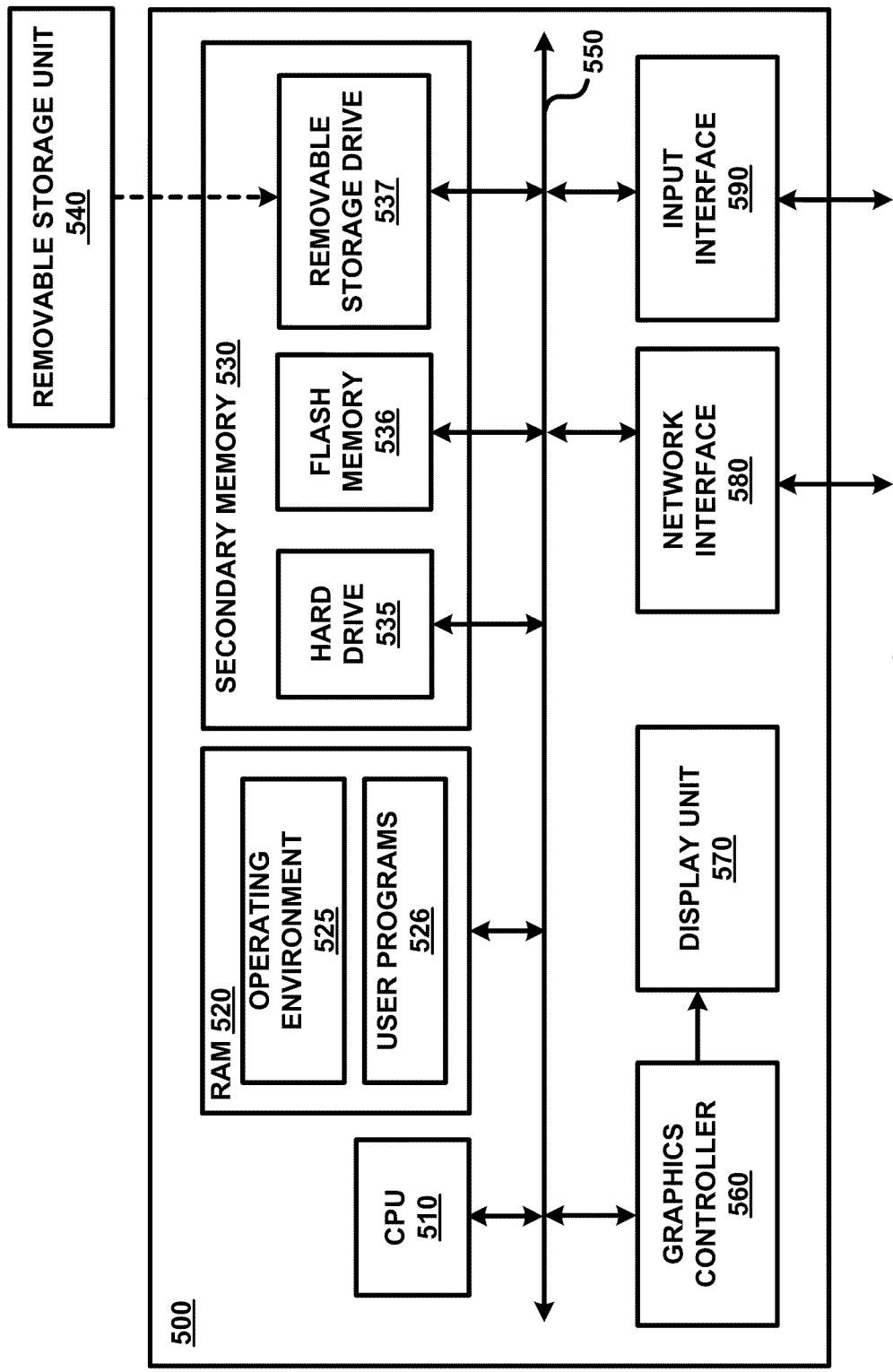
FIG. 5 is a block diagram illustrating the details of a digital processing system in which several embodiments can be implemented based on operation of software instructions.

FIG. 5 is a block diagram illustrating the details of a digital processing system (500) in which several embodiments of video encoder 100 of FIG. 1 are operative by execution of appropriate execution modules.

Digital processing system 500 may contain one or more processors such as a central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention. The instructions include those executed by the various blocks of FIG. 1. CPU 510 may contain multiple processing units, with each processing unit potentially being designed for a specific task. Alternatively, CPU 510 may contain only a single general-purpose processing unit.

RAM 520 may receive instructions from secondary memory 530 via communication path 550. RAM 520 is shown currently containing software instructions constituting operating environment 525 and/or user programs 526 (such as are executed by the blocks of FIG. 1). The operating environment contains utilities shared by user programs, and such shared utilities include operating system, device drivers, virtual machines, etc., which provide a (common) run time environment for execution of user programs/applications.

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and a pointing device (e.g., touch-pad, mouse), and may be used to provide inputs. Network interface 580 provides connectivity (by appropriate physical, electrical, and other protocol interfaces) to a network (not shown, but which may be electrically connected to path 199 of FIG. 1), and may be used to communicate with other systems connected to the network.

Secondary memory 530 may contain hard drive 535, flash memory 536, and removable storage drive 537. Secondary memory 530 may store data and software instructions, which enable digital processing system 500 to provide several features in accordance with the description provided above. The blocks/components of secondary memory 530 constitute computer (or machine) readable media, and are means for providing software to digital processing system 500. CPU 510 may retrieve the software instructions, and execute the instructions to provide various features of the embodiments described above.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A method of encoding image frames, each image frame containing a plurality of macro-blocks, each of the plurality of macro blocks formed of a plurality of pixels, the method comprising:
   receiving a macro-block in an image frame;
   determining whether the macro-block contains text;
   computing a quantization parameter for quantizing the macro-block, wherein the quantization parameter is computed to be smaller than a predetermined value if the macro-block is determined to contain text, wherein the determining comprises calculating a gradient for each pixel in each of a plurality of sub-blocks in the macro-block, computing, corresponding to each of the plurality of sub-blocks, an edge pixel count value representing the number of pixels with gradients greater than a first threshold value, selecting the highest of the edge pixel count values determined by the computing, classifying the macro-block as containing text if the highest of the edge pixel count values selected by the selecting has a value between a second threshold value and a third threshold value; and
   encoding the macro-block using the quantization parameter.

2. The method of claim 1, wherein the computing comprises:
   calculating a value for the quantization parameter according to an approach which ensures that the quantized output due to the encoding satisfies a desired output parameter; and
   reducing the value for the quantization parameter if the macro-block is determined to contain text and not reducing the value otherwise.

3. The method of claim 2, wherein the approach is specified by H.264 standard.

4. The method of claim 1, wherein calculating the gradient comprises:
   computing a horizontal gradient as the difference in pixel values of a first pixel and a second pixel lying adjacent in the horizontal direction of the image frame, a vertical gradient as the difference in pixel values of the first pixel and a third pixel lying adjacent in the vertical direction of the image frame, and a diagonal gradient as the difference in pixel values of the first pixel and a fourth pixel lying adjacent in the diagonal direction of the image frame; and
   selecting the gradient as the maximum of the horizontal gradient, the vertical gradient and the diagonal gradient.

5. The method of claim 1, wherein the first threshold value, the second threshold value, and the third threshold value are determined dynamically for each image frame.

6. The method of claim 5, wherein the second threshold value, and the third threshold value are determined adaptively for each image frame to ensure that each macro-block in at least one row of macro-blocks in the corresponding image frame is classified by the classifying as containing text.

7. A non-transitory machine readable medium storing one or more sequences of instructions in a video encoder, wherein execution of the one or more sequences of instructions by one or more processors contained in the video encoder causes the video encoder to perform the actions of:
   receiving a macro-block in an image frame;
   determining an activity measure of the macro-block and the size of the image frame;
   computing a quantization parameter for quantizing the macro-block, wherein the quantization parameter is computed to be smaller a predetermined value if the macro-block is determined to contain text, wherein the determining comprises calculating a gradient for each pixel in each of a plurality of sub-blocks in the macro-block, computing, corresponding to each of the plurality of sub-blocks, an edge pixel count value representing the number of pixels with gradients greater than a first threshold value, selecting the highest of the edge pixel count values determined by the computing, classifying the macro-block as containing text if the highest of the edge pixel count values selected by the selecting has a value between a second threshold value and a third threshold value; and
   encoding the macro-block using the quantization parameter.

8. The machine readable medium of claim 7, wherein the quantization parameter is computed to be smaller than otherwise if the transmission bit-rate available for the image frame is lower than a third threshold value even if the size of the image frame is determined not to be smaller than the second threshold value.

9. The machine readable medium of claim 8, wherein
   the quantization parameter in calculated to ensures that the quantized output due to the encoding satisfies a desired output parameter; and
   wherein the quantization parameter is reduced if the activity measure of the macro-block is determined to be higher than the first threshold value and the size of the image frame is determined to be smaller than the second threshold value, and not reducing the value otherwise.

10. The machine readable medium of claim 9, wherein the approach is specified by H.264 standard.

11. The machine readable medium of claim 10, wherein the activity measure (mbAct) is computed as a summation of activity measures (dij) for each pixel in the macro-block, wherein $$dij=|Oij-Oi(j-1)|+|Oij-O(i-1)j|$$

wherein,
- $|Oij-Oi(j-1)|$ is a horizontal activity measure computed as the absolute value of a difference between the pixel values at locations (i,j) and (i,j−1),
- $|Oij-Oi(i-1)j|$ is a vertical activity measure computed as the absolute value of a difference between the pixel values at locations (i,j) and (i−1,j),
- dij is the sum of the horizontal activity measure and the vertical activity measure corresponding to a pixel at location (i,j).

12. The machine readable medium of claim 11, wherein the quantization parameter is computed according to the equation:

$$Qmb=Qbase*(K*mbAct+frameAct)/(mbAct+K*frameAct),$$

wherein,
Qbase is the quantization parameter provided by a rate control block in the video encoder,
mbAct is the activity measure of the macro-block,
frameAct is the average activity measure of the frame containing the macro-block or a previous frame,
K is a scale factor,
Qmb is a modified quantization parameter,
wherein reducing the value of the quantization parameter comprises selecting a lower value of scale factor K.

13. The machine readable medium of claim 11, wherein computing the quantization parameter comprises computing each of a plurality of values of quantization parameters of a scaling matrix corresponding to each of a corresponding plurality of frequency components in the macro-block,
wherein reducing the value of the quantization parameter comprises:
selecting, from a set of scaling matrices, a scaling matrix containing quantization parameters that are smaller for higher frequencies compared to other scaling matrices containing quantization parameters that are larger for higher frequencies.

14. A machine readable medium storing one or more sequences of instructions in a video encoder, wherein execution of the one or more sequences of instructions by one or more processors contained in the video encoder causes the video encoder to perform the actions of:
receiving a macro-block in an image frame;
determining whether the macro-block contains text;
computing a quantization parameter for quantizing the macro-block, wherein the quantization parameter is computed to be smaller if the macro-block is determined to contain text, wherein the determining comprises calculating a gradient for each pixel in each of a plurality of sub-blocks in the macro-block, computing, corresponding to each of the plurality of sub-blocks, an edge pixel count value representing the number of pixels with gradients greater than a first threshold value, selecting the highest of the edge pixel count values determined by the computing, classifying the macro-block as containing text if the highest of the edge pixel count values selected by the selecting has a value between a second threshold value and a third threshold value; and
encoding the macro-block using the quantization parameter.

15. The machine readable medium of claim 14, wherein the computing comprises:
calculating a value for the quantization parameter according to an approach, which ensures that the quantized output due to the encoding satisfies a desired output parameter; and
reducing the value for the quantization parameter if the macro-block is determined to contain text and not reducing otherwise.

16. The machine readable medium of claim 15, wherein the approach is specified by H.264 standard.

17. The machine readable medium of claim 14, wherein calculating the gradient comprises:
computing a horizontal gradient as the difference in pixel values of a first pixel and a second pixel lying adjacent in the horizontal direction of the image frame, a vertical gradient as the difference in pixel values of the first pixel and a third pixel lying adjacent in the vertical direction of the image frame, and a diagonal gradient as the difference in pixel values of the first pixel and a fourth pixel lying adjacent in the diagonal direction of the image frame; and
selecting the gradient as the maximum of the horizontal gradient, the vertical gradient and the diagonal gradient.

18. The machine readable medium of claim 14, wherein the first threshold value, the second threshold value, and the third threshold value are determined dynamically for each image frame.

* * * * *